United States Patent Office 3,522,664
Patented Aug. 4, 1970

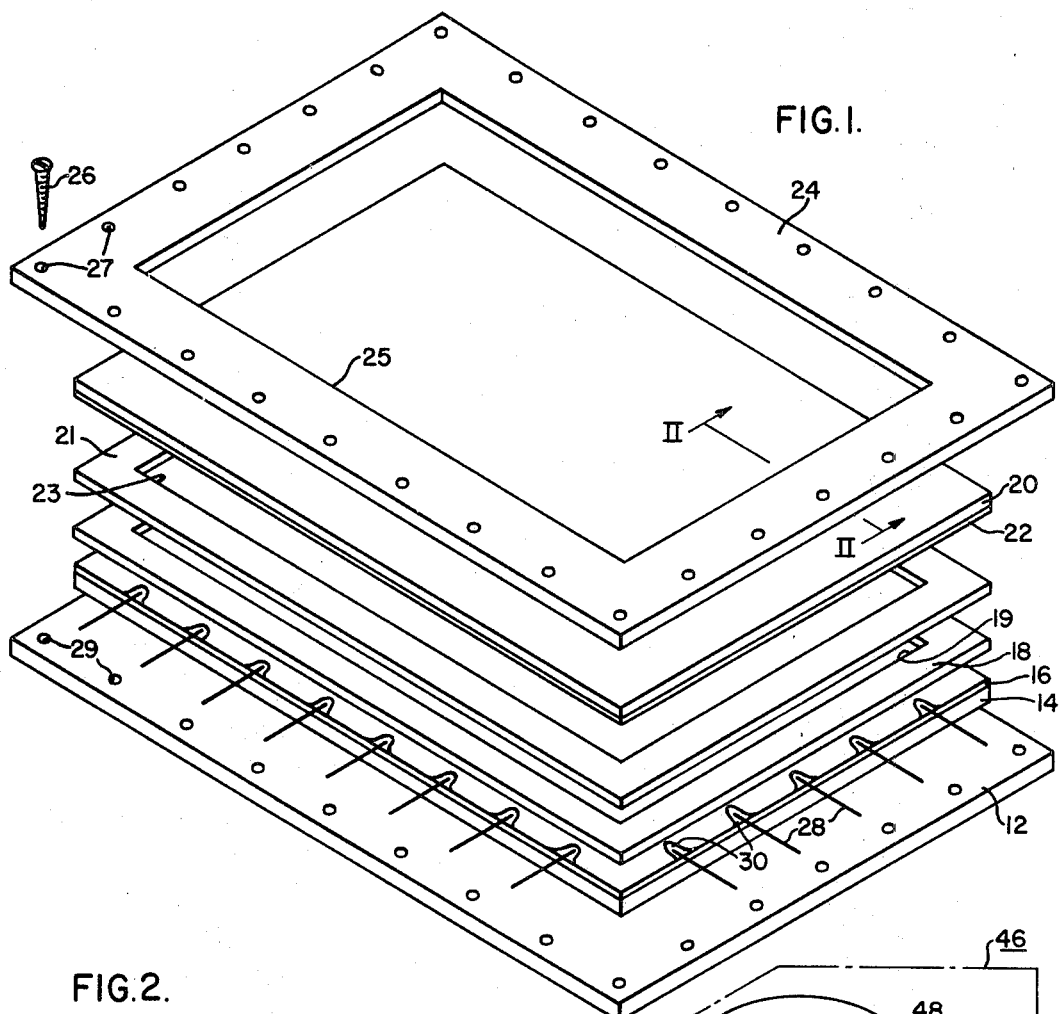
FIG. 1.
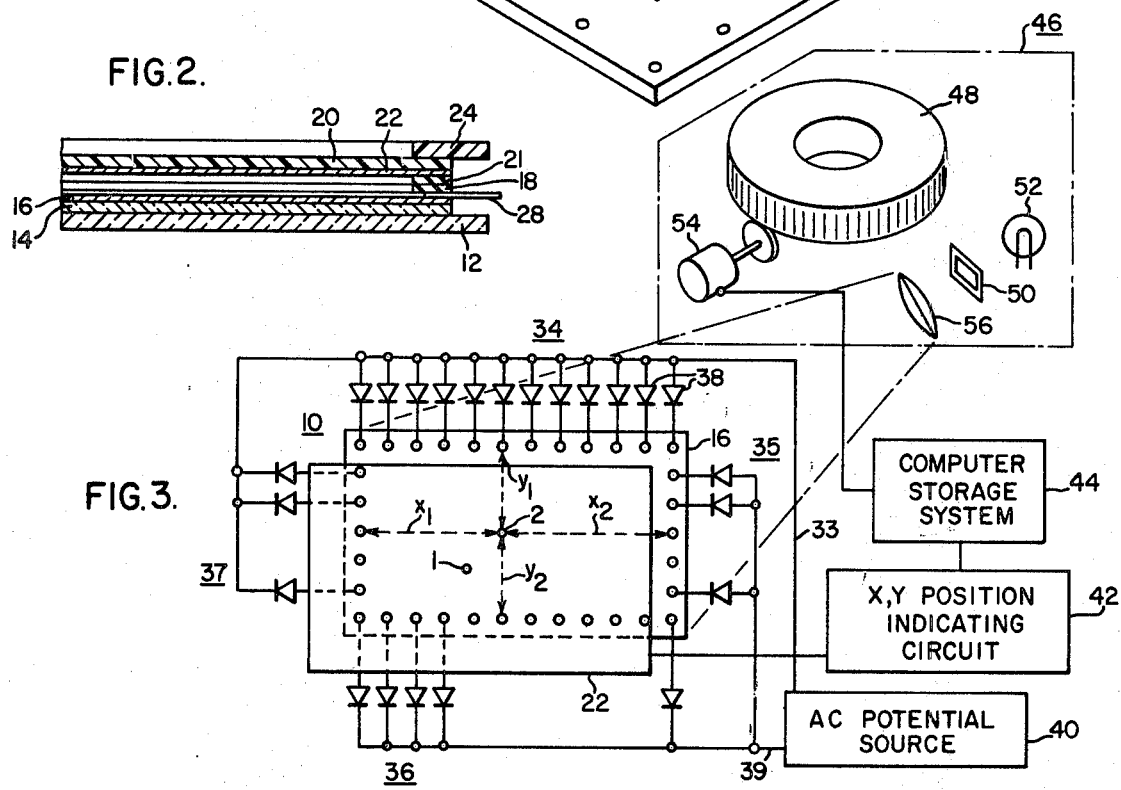
FIG. 2.
FIG. 3.

3,522,664
INTERFACE DEVICE AND DISPLAY SYSTEM
John E. Lambright, Monroeville, Bruce R. Dow, Murrysville, and Clyde A. Booker, Jr., Pittsburgh, Pa., assignors to Westinghouse Electric Corporation, Pittsburgh, Pa., a corporation of Pennsylvania
Filed Nov. 20, 1967, Ser. No. 684,293
Int. Cl. G09b 7/00
U.S. Cl. 35—8
3 Claims

ABSTRACT OF THE DISCLOSURE

This invention relates to an interface device including a transparent, flexible member which is coated with a suitable transparent, electrically conductive layer, and a transparent base member which has been coated with a layer of a resistive material. The flexible and base members are supported in a spaced relationship so that when pressure is applied to the flexible member it will be placed into contact with a particular portion of the layer of resistive material. Sets of diodes may be connected to the layer of resistive material and a source of alternating potential may be connected to the sets of diodes to successively direct currents along the X, Y coordinates of the layer of resistive material. When the flexible layer is brought into contact with the layer of resistive material, a signal is derived from the conductive layer which is indicative of the X, Y position of the point of contact. Such an interface device may be incorporated into a display system in which signals indicative of the X, Y coordinates of the point of contact may be used to control the image which is seen through the interface device.

BACKGROUND OF THE INVENTION

Field of the invention

This invention relates to interface devices, and more particularly to those interface devices which are sensitive to pressure to indicate the point at which the pressure is applied.

Description of the prior art

In order to impress a bit of information upon a student, it is desirable to correlate a physical movement of the student with the information being perceived by the student. In the present art, computers are adapted to store great quantities of educational materials which are presented to the student at the command of the computer. In turn, the computer is programmed to respond to the answer of the student. Therefore, simple interface devices are needed which communicate between a human and the storage computer. A particularly useful device for programmed instruction is a two dimensional array of points arranged in an X, Y coordinate system, which the student may activate manually. When a student applies pressure to a point in this array, the interface device should transmit to a computer logic signal which indicates which of the points was selected by the student.

Further, it is desirable to design the interface device so that the desired educational information may be displayed through or upon the interface device which the student activates by touching. Thus, in an educational system, discrete bits of educational information would be displayed upon the interface device. After a series of facts has been presented to the student, the student is asked a question and required to respond to the information by touching a portion of the interface device. The interface device should then be able to give a signal indicating the portion of the interface device which the student pressed. In turn, a computer circuit is adapted to evaluate the response of the student and to control the presentation of a new series of information bits. If the student responded correctly upon the interface device, a new set or series of informational bits will be presented to the student. On the other hand, if the student responds incorrectly, remedial instruction will be presented to the student.

At present, an interface device as described in the copending application Ser. No. 585,007 entitled "Display Screen and Switching Matrix," by H. A. Wagner has been used as an interface device in a teaching system as described above. The display screen, switching matrix as described in the above-identified copending application includes a plastic plate with square depressions milled therein. The square depressions correspond to the actvie areas or points of the switching array. Electrically conductive members such as wires are stretched across the depressions in both the X and Y directions. The wires are placed under tension and are disposed within the depressions so that the X direction wires do not normally contact the Y direction wires. A flexible layer with a matt surface on one side is disposed across the X and Y sets of wires so that when a portion of the flexible layer is pressed, the wires disposed beneath that point of the flexible layer will be brought into contact with each other.

It is an object of this invention to provide a new and improved interface device in which the pattern of conductive elements do not interfere with the presentation of information through the interface device. Further, it is desirable to provide an interface device with greater resolution than can be achieved by the use of discrete electrically conductive members.

SUMMARY OF THE INVENTION

These and other objects are accomplished in accordance with the teachings of the present invention by providing a new and improved interface device including a first base member which is transparent to radiation and has a surface layer of a resistive material that is likewise transparent to radiation. The interface device further includes a second, flexible layer having a transparent surface layer of an electrically conductive material. The flexible layer is disposed above and spaced from the layer of resistive material so that when a portion of the flexible layer is pressed, the layer of electrically conductive material and the layer of resistive material are brought into contact with each other. Further, several sets of diodes are connected to the layer of resistive material, and an alternating potential source is applied between these sets of diodes to alternatively apply currents in the X, Y directions of the interface device. When the layer of electrically conductive material is brought into contact with the layer of resistive material, a signal is derived which is indicative of the X, Y coordinates of the point of contact. This signal may be applied to a computer circuit to thereby control the display of information through or upon the interface device.

DESCRIPTION OF THE DRAWINGS

These and other objects and advantages of the present invention will become more apparent when considered in view of the following detailed description and drawings, in which:

FIG. 1 is an orthogonal view of an interface device in accordance with the teachings of this invention;

FIG. 2 is a section view of the interface device of FIG. 1 as taken along line II—II of FIG. 1; and FIG. 3 is a diagrammatic view of the interface device of FIGS. 1 and 2 incorporated into a teaching system designed to project various images onto the interface device as controlled by the input responses on various portions of the interface device.

DESCRIPTION OF THE PREFERRED EMBODIMENT

Referring now to the drawings and in particular to FIGS. 1 and 2, there is shown an illustrative embodiment of an interface device 10 including a base support member 12 made of a structurally rigid material which is transmissive to radiation, such as glass or plastic. A support layer 14 is disposed on top of the support member 12 and is coated with a suitable layer 16 of a suitable radiation transmissive, uniform resistive material such as $SnO_2$ having a resistvity of 500 ohms per square. The support layer 14 may be made of a suitable radiation transmissive material such as glass which will easily adhere to the layer 16 of uniform resistance. Next, a spacing frame 18 is disposed on top of the layer 16 of uniform resistance. As shown in FIG. 1, the frame 18 is of substantially rectangular configuration with an opening 19 therein to expose the layer 16 of uniform resistance to a layer 22 of a suitable electrically conductive material. The layer 22 of electrically conductive material is applied to a flexible layer 20 of a suitable transmissive material such as the plastic, Mylar. The layer 22 of electrically conductive material may illustratively be a thin layer of chromium having a resistivity of approximately 10,000 ohms per square. Preferably, the layer 22 should be of lower resistance per unit measurement than the layer 16. However, difficulty was encountered in adhering a low resistive layer to the flexible layer 20. The greater resistivity and possible non-uniformity of the layer 22 may be compensated for by using a detection circuit of substantially greater impedance than that of the layer 22, and by the use of a contact member 21 made of a highly conductive material and having a substantially rectangular configuration with an opening 23, and disposed against the layer 22 for making electrical contact to the periphery of the layer 22. As shown in FIG. 1, the frame 18 serves to space the contact member 21 from the layer 16 of uniform resistance. The frame 18 is of sufficient thickness to separate the center portions of the layers 16 and 22. A clamping frame 24 is disposed on top of the flexible layer 20 by a plurality of clamping means 26 such as screws which are disposed through openings 27 within the frame 24 to engage the openings 29 within the base support member 12. The clamping frame 24 has an opening 25 which exposes the flexible layer 20 so that a user may press on various portions of the interface device to bring the electrically conductive layer 22 into contact with a corresponding portion of the uniform resistance layer 16. In the assembly of the interface device 10, the flexible layer 20 is stretched tightly over the spacing frame 18 while the screws 26 are being inserted through the holes 27 into the holes 29 of the base support member 12. Thus, when no pressure is applied to the flexible layer 20, the layer 22 will not be in contact with the layer 16 of uniform resistance. Before the assembly operation, a plurality of electrical connections 28 are made along the periphery of the layer 16 at points equally spaced from each other. Illustratively, portions 30 of the layer 16 may be metallized with a thin layer of silver. The electrical connections 28 may be applied directly to the silver or in the alternative, may be attached thereto by a silver epoxy.

Referring now to FIG. 3, there is shown an image display system including the interface device 10 described with respect to FIGS. 1 and 2, and an image projector 46 for projecting a desired image onto the interface device 10 in response to the application of pressure upon a particular portion of the interface device 10. The image projector 46 includes a magazine 48 for storing a plurality of slides or transparencies 50. The image projector 46 further includes a lamp 52 and a suitable lens system 56 for focusing the image contained upon the transparency 50 onto the interface device 10. Though only the transparent layers 16 and 22 are shown in the schematic diagram of FIG. 3, it may be understood that the surface of the base support member 12 exposed to the projector 46 may be roughened to provide a mat or beaded surface. The lens assembly 54 may be adjusted to focus the image of the transparency 50 onto the mat surface of the base support member 12. Since the layers 12, 14, 16, 20 and 22 are suitably radiation transmissive, the student or other user of the interface device 10 may view the image that is projected on the beaded surface of the member 12.

A stepping motor 54 is operative to index the magazine 48 to a predetermined position corresponding to the activated portion of the interface device 10. In response to a signal derived from a computer storage system 44, the stepping motor 54 rotates the magazine 48 to dispose the desired transparency 50 in the lens system 56 of the projector 46. As will be explained later, a computer storage system 44 is operative in response to the interface device 10 to project the image of desired transparency 50 onto the interface device 10 in response to a signal corresponding to a particular set of coordinates of the interface device 10. As shown in FIG. 3, a plurality of sets 34, 35, 36 and 37 of diodes 38 are connected about the periphery of the layer 16 of resistive material. More specifically, the sets 34 and 36 of diodes are connected along the horizontal edges (as seen in FIG. 3) of layer 16 in order to conduct currents along the Y coordinates of the layer 16. The sets 35 and 37 of diodes 38 are connected along the vertical edges of the layer 16 in order to conduct currents along the X coordinates of the layer 16. The sets 34 and 37 of the diodes 38 are connected to a conductive member 33, which is in turn connected to one terminal of an AC potential source 40. The sets 35 and 36 of diodes 38 are connected by a second electrically conductive member 39 to the other terminal of the potential source 40.

When a point on the flexible layer 20 is pressed, a portion (designated by the numeral 1) of the layer 22 of electrically conductive material is brought into contact with a corresponding point (designated by numeral 2) of the layer 16. The sets 34, 35, 36 and 37 of diodes pass the flow of current in a single direction at any one instant of time. Thus, the potential developed over a given portion of the resistive layer and thus the length or coordinate between a set of diodes and the point 2 may be determined by measuring the potential applied to the layer 22 of electrically conductive material. More particularly, when the current is flowing along the X coordinates of the layer 16, the following formulas will provide a measurement of the $X_1$ and $X_2$ coordinates of the point 2:

$$E_1/E_2 = R_1/R_2 = X_1/X_2 \qquad (1)$$
$$E_1 + E_2 = E_3 \qquad (2)$$
$$R_1 + R_2 = R_3 \qquad (3)$$
$$X_1 + X_2 = X_3 \qquad (4)$$

where $E_1$ is the potential developed between the set 37 of diodes and the point 2; $E_2$ is the potential developed between the point 2 and the set 35 of diodes; $E_3$ is the value of potential applied by the source 40; $R_1$ and $R_2$ are respectively the values of resistance presented between the point 2 and the sets 37 and 35 of diodes; $R_3$ is the total resistance across the X coordinate of the layers 16; $X_1$ and $X_2$ are the lengths of the coordinates along the X direction of the layer 16 between the points of connection of the diodes and the point 2; and $X_3$ is the entire dimension along the vertical or X coordinate of the layer 16. Since the values of $X_3$ and $E_3$ are known and constant, and the potential $E_1$ is that potential applied to the layer 22 and may be measured by an X, Y position indicating circuit 42, the values of $X_1$ and $X_2$ can be likewise measured by the circuit 42. In order to measure the value of the coordinates $Y_1$ and $Y_2$, the potential applied between the conductive members 33 and 39 is reversed and the current will now flow between the sets 34 and 36 of diodes along the Y coordinates of the layer 16. The equations given above also apply to define the Y coordinates of the position of the points 1 and 2 of contact between the layers 22 and 16. If the X coordinate signal is stored while obtaining a Y coordinate and vice versa, a continuous output of the coordinates of the point 1 (and 2) of contact will be available. The source 40 may be set at a rate which is fast enough that if the layer 16 is approximately 10 inches square, a person moving his hand across the layer 22 cannot change the point of contact more than 0.1% of the X or Y dimension in a millisecond. The potential signals corresponding to the X and Y coordinates of the point of contacts of the layers 22 and 16 is applied to the X, Y position indicating circuit 42 which measures the potential derived from the layer 22 to indicate one of the coordinates of the point of contact. During the next half cycle of the AC potential source 40, the X, Y position indicating circuit 42 measures the other coordinate of the point of contact. Illustratively, the developed analog coordinate signals may be converted by the circuit 42 to digital signals which may be processed by the storage system 44. A further description of an illustrative embodiment of the circuit 42 is found in an article entitled "'Light-Pen' Facilities for Direct View Use Storage Tubes—Economical Solution for Multiple Man-Machine Combination" by G. A. Rose, IEEE Transactions on electronic computers, pp. 637–639, August 1965.

In operation, a series of informational bits may be presented by projecting images of the transparencies 50 onto the interface device 10. After the information has been presented, a transparency 50 will be selected that will ask for a response by the student. The student will reply by pressing a particular portion of the interface device 10. As explained above, a potential will be developed upon the layer 16 indicating the coordinates of the point depressed by the student and thus his answer. The X, Y position indicating circuit 42 will provide an output signal indicating the coordinates of the point contact between the layers 22 and 16 and will apply this signal to the computer storage system 44. The computer storage system 44 functions to evaluate the answer of the student. If the student responded correctly, the projector will be activated to present a new series of transparencies 50 to the student. If the student responded incorrectly, the computer storage system 44 will control the projector 46 to redisplay the transparency 50 or to display remedial information.

Another possible use for the interface device described above is to replace the standard typewriter keyboard now used in teaching machines. The typewriter keyboard of the present art has several undesirable features. The first is the inability to change the keyboard format. The designation of the keys can be changed but the positions cannot. The second undesirable feature is the audible mechanical noise present when the keys are touched. A louder noise is produced when the keyboard is cleared.

After a key is selected, the keyboard locks the keys into a set position in order to prevent another key selection while the computer is evaluating the first response. When the computer is ready to receive another key selection, the computer signals a clear operation to the keyboard. This produces a very audible noise in the keyboard as it is cleared. This noise is a clue to the student that the keyboard is active and it is undesirable when using certain psychology experiments. In order to use the interface device as a keyboard, an appropriate templet is disposed behind the base support member 12 with regard to the student. The templet is visible through the transparent members of the interface device 10 and serves to define the various positions of the interface device. The student will hear no clicks or other key noises unless some audible signal is provided. This external audio signal can be controlled, whereas the sounds of the normal keyboard cannot.

Thus, there has been described an interface device that does not give off audible sounds which may clue the student or undesirably effect his response. Further, the interface device of this invention is capable of a greater resolution than will normally be required. The diameter of the finger of the user limits the usable resolution and is larger than the resolution of which this device is capable. More specifically the linearity of the layer 16 of resistive material is approximately 2%. Effectively, the layer 16 of resistive material limits the resolution to approximately .24 inch for a 12 inch square device. However, such resolution is more than adequate to provide a 16 x 16 array of discrete selectable points.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed is:
1. An interface device comprising:
   a first layer having a uniform resistance per unit of measurement;
   a second layer having a conductive surface disposed thereon toward said first layer and comprising a continuous, electrically conductive material,
   said first and second layers being both transmissive to visible radiation,
   a spacer disposed between said first and second layers for normally keeping said layers out of electrical contact with one another,
   said second layer being flexible so as to make electrical contact to said first layer at a point where depressed;
   a first plurality of electrical conductors respectively disposed in spaced relationship along opposite sides of said first layer in electrical contact therewith;
   a second plurality of electrical conductors respectively disposed in spaced relationship along the other pair of opposite sides of said first layers in electrical contact therewith;
   said first and second pluralities of electrical conductors forming a matrix with said first layer so that respective coordinate positions may be established;
   supply means for respectively applying current to said first and second pairs of conductors; and
   indication means operatively connected to said second layer for respectively indicating the coordinate position where said second layer is depressed to make electrical contact with said first layer.

2. An interface device as claimed in claim 1, wherein a set of indicia is disposed to be visible through said first and second layers to thereby define various portions of said interface device.

3. A teaching system including the interface device of claim 1, and means for projecting images upon said interface device which are visible through said first and second layers.

References Cited

UNITED STATES PATENTS

| | | | |
|---|---|---|---|
| 2,900,446 | 8/1959 | McLaughlin et al. | 178—18 |
| 2,953,859 | 9/1960 | Fink | 35—9 |
| 2,975,235 | 3/1961 | Leitner et al. | 178—18 |
| 3,032,609 | 5/1962 | Fluhr et al. | 178—18 |
| 3,052,879 | 9/1962 | McLaughlin. | |
| 3,102,926 | 9/1963 | Fluhr et al. | 178—18 |
| 3,304,612 | 2/1967 | Proctor et al. | 178—18 |
| 3,308,253 | 3/1967 | Krakinowski | 178—18 |
| 3,382,588 | 5/1968 | Serrell et al. | 35—9 |

EUGENE R. CAPOZIO, Primary Examiner

W. H. GRIEB, Assistant Examiner

U.S. Cl. X.R.

178—18; 340—166